United States Patent
Hanrahan

(10) Patent No.: US 12,253,026 B1
(45) Date of Patent: Mar. 18, 2025

(54) REAR BEARING AIR SOURCED AND VENTED TO NOSE CONE

(71) Applicant: Raytheon Technologies Corporation, Farmington, CT (US)

(72) Inventor: Paul R. Hanrahan, Sedona, AZ (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/133,709

(22) Filed: Apr. 12, 2023

(51) Int. Cl.
*F02C 7/18* (2006.01)
*F02C 7/06* (2006.01)

(52) U.S. Cl.
CPC .......... *F02C 7/06* (2013.01); *F02C 7/18* (2013.01); *F05D 2260/205* (2013.01); *F05D 2260/98* (2013.01)

(58) Field of Classification Search
None
See application file for complete search history.

(56) References Cited

U.S. PATENT DOCUMENTS

| 3,453,825 | A | * | 7/1969 | May | F01D 5/081 60/726 |
|---|---|---|---|---|---|
| 3,859,785 | A | * | 1/1975 | Leto | F02C 7/32 416/198 A |
| 7,475,549 | B2 | * | 1/2009 | Alexander | F01D 15/10 415/121.2 |
| 8,262,344 | B2 | * | 9/2012 | Alexander | F01D 25/125 415/121.2 |
| 10,968,827 | B2 | | 4/2021 | Alecu et al. | |
| 11,078,843 | B2 | * | 8/2021 | Roberge | F02C 7/18 |
| 2018/0306115 | A1 | * | 10/2018 | Motsch | F02C 7/18 |

FOREIGN PATENT DOCUMENTS

DE        102010049885 B4       6/2015

* cited by examiner

*Primary Examiner* — Kayla Mccaffrey
(74) *Attorney, Agent, or Firm* — Bachman & LaPointe, P.C.

(57) ABSTRACT

A rear bearing air cooling system including an engine inlet section housing a nose cone; a central rotor shaft interior of the nose cone; a rear bearing supporting the central rotor shaft; and a cooling air passage formed through the nose cone and the central rotor shaft, the cooling air passage in fluid communication with the nose cone, the rear bearing and a nose cone vent.

18 Claims, 2 Drawing Sheets

REAR BEARING AIR SOURCED AND VENTED TO NOSE CONE

BACKGROUND

The present disclosure is directed to expendable gas turbine engines with an improved bearing cooling system, particularly an air-cooled rear bearing.

Attritable or expendable propulsion systems have a short lifespan relative to typical flight applications. The attritable engine is utilized for a limited lifespan and disposed. The attritable gas turbine engine may not even be operated through a full operational cycle. The attritable gas turbine engine may only perform start-up, and operational load before being decommissioned.

Since the operational modes of the attritable gas turbine engine may be significantly less than the conventional gas turbine engine, the attritable engine does not need to meet the same durability or safety requirements as the conventional gas turbine engine. Conventional gas turbine engine designs deployed for attritable engines can be more costly and more complex than needed.

What is needed is a less complex and less costly turbine engine design for the attritable engine.

SUMMARY

In accordance with the present disclosure, there is provided a rear bearing air cooling system comprising an engine inlet section housing a nose cone; a central rotor shaft interior of the nose cone; a rear bearing supporting the central rotor shaft; and a cooling air passage formed through the nose cone and the central rotor shaft; the cooling air passage in fluid communication with the nose cone, the rear bearing and a nose cone vent.

A further embodiment of any of the foregoing embodiments may additionally and/or alternatively include the rear bearing air cooling system further comprising a central static tube disposed within the central rotor shaft; wherein the central static tube bounds the cooling air passage configured to facilitate cooling air transport through the central rotor shaft from the rear bearing to the nose cone vent.

A further embodiment of any of the foregoing embodiments may additionally and/or alternatively include a cooling air is in fluid communication with the cooling air passage, the cooling air configured to cool the rear bearing.

A further embodiment of any of the foregoing embodiments may additionally and/or alternatively include a liquid lubricant is fluidly coupled with the cooling air, entrained in the cooling air and provided to lubricate the rear bearing.

A further embodiment of any of the foregoing embodiments may additionally and/or alternatively include the liquid lubricant is a fuel.

A further embodiment of any of the foregoing embodiments may additionally and/or alternatively include the rear bearing air cooling system further comprising perforations formed in the nose cone in fluid communication with the annular tube, wherein the cooling air is impelled into the cooling air passage through the perforations in the nose cone via a ram air pressure near a nose cone exterior.

A further embodiment of any of the foregoing embodiments may additionally and/or alternatively include the cooling air passage is configured to discharge the cooling air proximate the nose cone vent at an engine static air pressure.

In accordance with the present disclosure, there is provided an attritable gas turbine engine rear bearing air cooling system comprising an engine inlet casing connected to a nose cone; a central rotor shaft connected to engine inlet casing interior of the nose cone; wherein the central rotor shaft is configured to translate rotary motion along a length of a gas turbine engine; a rear bearing supporting the central shaft; and a cooling air passage formed through the nose cone and along the central rotor shaft; the cooling air passage in fluid communication with the nose cone, the rear bearing and a nose cone vent.

A further embodiment of any of the foregoing embodiments may additionally and/or alternatively include an annular tube is configured as an annulus formed along the exterior of the central rotor shaft.

A further embodiment of any of the foregoing embodiments may additionally and/or alternatively include the attritable gas turbine engine rear bearing air cooling system further comprising a central static tube disposed within the central rotor shaft; wherein the central static tube bounds the cooling air passage fluidly coupling the cooling air through the central static tube from the rear bearing to the nose cone vent.

A further embodiment of any of the foregoing embodiments may additionally and/or alternatively include the attritable gas turbine engine rear bearing air cooling system further comprising perforations formed in the nose cone in fluid communication with the cooling air passage, wherein the cooling air is impelled into the cooling air passage through the perforations in the nose cone via a ram air pressure near a nose cone exterior.

A further embodiment of any of the foregoing embodiments may additionally and/or alternatively include the cooling air passage is configured to discharge the cooling air proximate the nose cone vent at an engine static air pressure, the engine static pressure being less than the ram air pressure near the nose cone exterior.

A further embodiment of any of the foregoing embodiments may additionally and/or alternatively include.

In accordance with the present disclosure, there is provided a process for cooling an attritable gas turbine engine rear bearing with a rear bearing air cooling system comprising connecting an engine inlet casing to a nose cone; connecting a central rotor shaft to the engine inlet casing; supporting the central rotor shaft with a rear bearing; forming a cooling air passage through the nose cone and along the central rotor shaft; and fluidly coupling the cooling air passage with the nose cone, the rear bearing and a nose cone vent.

A further embodiment of any of the foregoing embodiments may additionally and/or alternatively include the process further comprising locating an annular tube along an exterior of the central rotor shaft.

A further embodiment of any of the foregoing embodiments may additionally and/or alternatively include the process further comprising disposing an insulated central static tube within the central rotor shaft; forming the central static tube as a portion of the cooling air passage; and fluidly coupling the cooling air through the central static tube from the rear bearing to the nose cone vent.

A further embodiment of any of the foregoing embodiments may additionally and/or alternatively include the process further comprising forming perforations in the nose cone in fluid communication with cooling air passage; and impelling the cooling air into the cooling air passage through the perforations in the nose cone via a ram air pressure near a nose cone exterior.

A further embodiment of any of the foregoing embodiments may additionally and/or alternatively include the process further comprising configuring the cooling air passage to discharge the cooling air proximate the nose cone vent at an engine static air pressure, the engine static pressure being less than the ram air pressure near the nose cone exterior.

A further embodiment of any of the foregoing embodiments may additionally and/or alternatively include the process further comprising fluidly coupling a liquid lubricant with the cooling air; entraining the liquid lubricant in the cooling air; and lubricating the rear bearing.

A further embodiment of any of the foregoing embodiments may additionally and/or alternatively include the liquid lubricant is a fuel.

A further embodiment of any of the foregoing embodiments may additionally and/or alternatively include the process further comprising passing the cooling air over the rear bearing; and cooling the rear bearing.

Other details of the rear bearing air cooling system are set forth in the following detailed description and the accompanying drawings wherein like reference numerals depict like elements.

DETAILED DESCRIPTION

Figure 1:
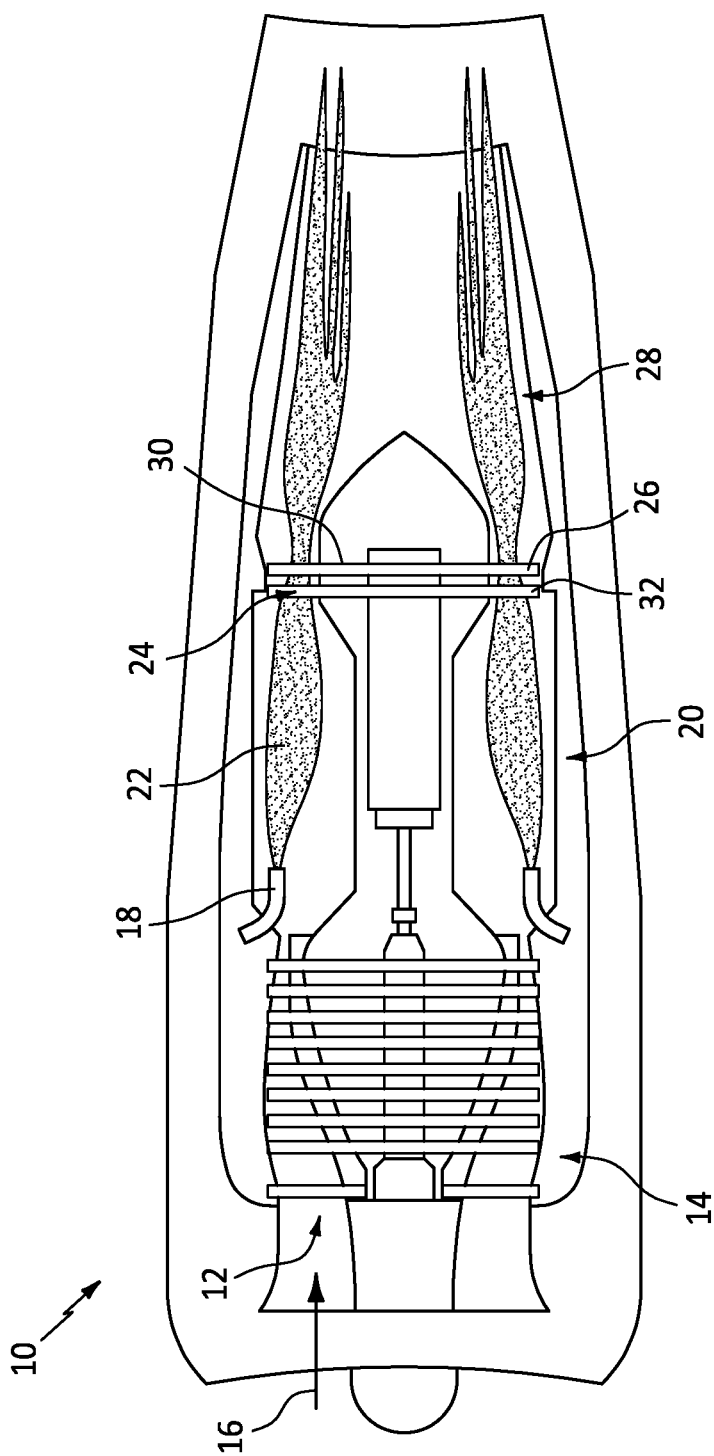
FIG. 1 is a cross sectional view schematic representation of an exemplary attritable gas turbine engine.

Referring now to FIG. 1, there is illustrated an exemplary attritable gas turbine engine, specifically a turbojet engine 10. The gas turbine engine 10 includes an inlet section 12 upstream of a compressor section 14 where air 16 is drawn in and compressed. Fuel 18 is injected into a combustion section 20 downstream of the compressor section 14. The air 16 is mixed with fuel 18 and burned in the combustion section 20. The combusted fuel 18 and air 16 are combined into a highly energized combustion product 22 that expands through a turbine section 24. The products of combustion 22 move downstream over turbine rotors 26, driving the turbine rotors 26 to rotate creating rotary power. The products of combustion 22 move downstream and exit the turbine section 24 to the exhaust nozzle section 28 where engine thrust is developed for propulsion.

Figure 2:
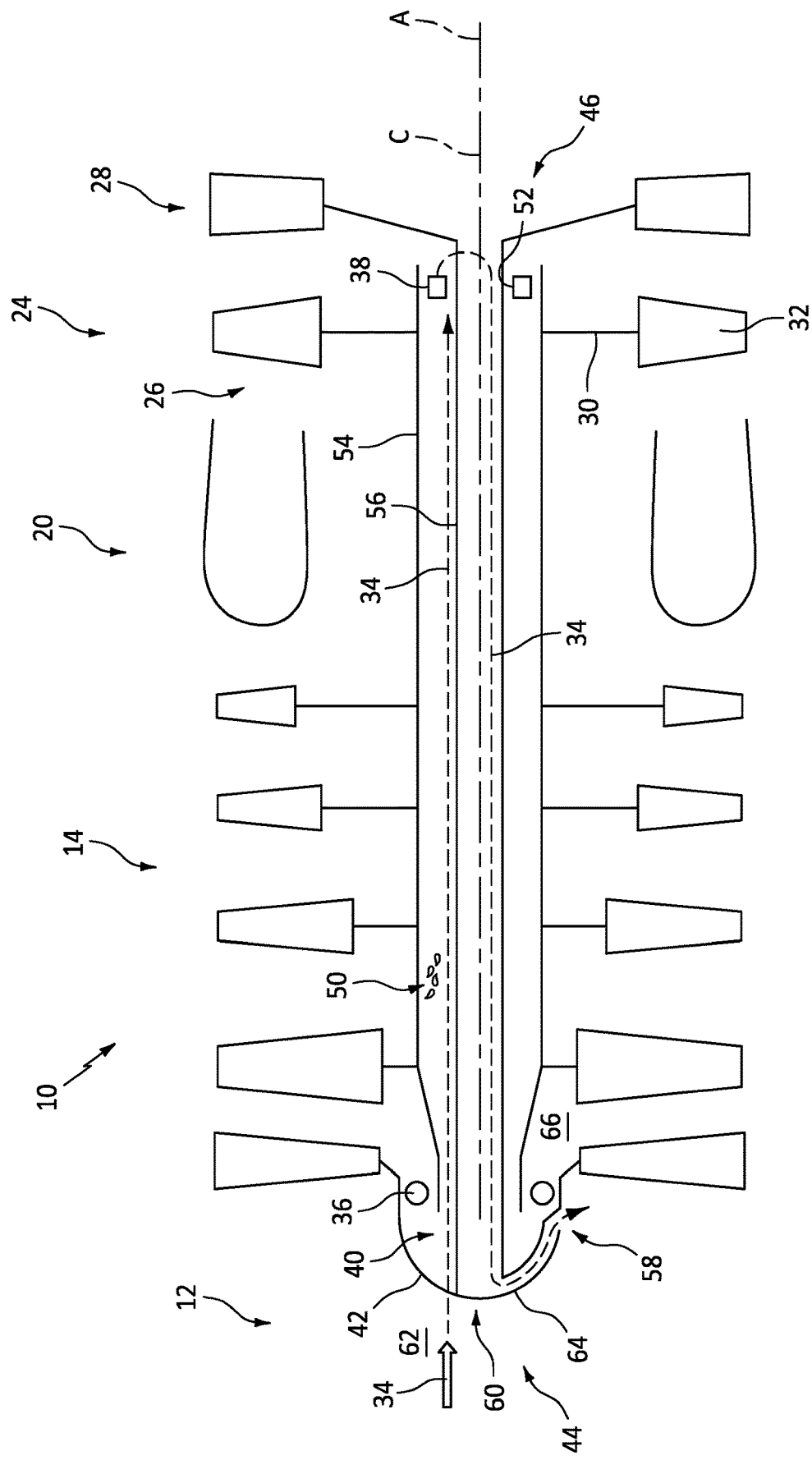
FIG. 2 is a cross sectional view schematic representation of an exemplary rear bearing air cooling system.

Referring also to FIG. 2, the turbine rotors 26 can include a rotor disk 30, and a plurality of circumferentially spaced turbine blades 32. Since the rotor disk 30 and turbine blades 32 are subject to extreme temperatures, cooling air 34 is delivered to forward bearings 36 and rear bearings 38 and the disk 30 and blade 32 for cooling. The rotor disk 30 rotates about an axis A along the engine centerline C.

The rear bearing 38 can be air cooled from the cooling air 34 routed through a cooling air passage 40 formed through a nose cone 42 located at the forward end 44 of the engine 10. The nose cone 42 can be located proximate the engine inlet section 12. The rear bearings 38 are proximate the aft end 46 of the engine 10. The cooling air passage 40 can be located along the engine centerline C. The cooling air passage 40 can be configured for the cooling air 34 to pass through the engine 10 aft toward the rear bearings 38. In an exemplary embodiment, the cooling air 34 can be used to entrain a liquid lubricant 50 and propel the liquid lubricant 50 along the cooling air passage 40 aft to rear bearing 38. In an exemplary embodiment, the liquid lubricant 50 can be a liquid fuel. The cooling air 34 passes over the rear bearings 38, cools the rear bearings and disposes the liquid lubricant 50 on the rotating contacting surfaces 52 of the rear bearings 38. The central rotor shaft 54 can translate rotary motion along the length of the engine 10.

A central static tube 56 can be disposed within the central rotor shaft 54. The central static tube 56 can be part of the cooling air passage 40 configured to facilitate the evacuation of cooling air 34 by transport through the engine 10 from the aft end 46 to the forward end 44 subsequently to the cooling air 34 passing over the rear bearings 38. The central static tube 56 is in fluid communication with the nose cone 42 and the rear bearings 38. The central static tube 56 can be insulated to prevent unwanted thermal energy transfer from the evacuating cooling air 34 to the incoming cooling air 34.

A nose cone vent 58 is located proximate the nose cone 42. The nose cone vent 58 is in fluid communication with the central static tube 56. The nose cone vent 58 is in fluid communication with the inlet section 12. The nose cone vent 58 is configured to discharge the cooling air 34 to the inlet section 12.

The cooling air 34 is impelled into the cooling air passage 40 through perforations 60 in the nose cone 42 via a ram air pressure 62 near the nose cone exterior 64. The engine ram air pressure 62 can be equal to an engine total air pressure. The cooling air 34 is discharged from the cooling air passage 40 proximate the nose cone vent 58 at an engine static air pressure 66. The ram air pressure 62 is greater than the engine static air pressure 66. The air proximate the nose cone exterior 64 can have an air speed that provides the pressure differential between the nose cone 42 and the nose cone vent 58.

A technical advantage of the disclosed rear bearing air cooling system includes a design that permits the air that cools the bearing to be fed from a lower pressure source to transport liquid lubricant to the rear bearings.

Another technical advantage of the disclosed rear bearing air cooling system includes a design that permits the air that cools the bearing to be fed from a cooler source.

Another technical advantage of the disclosed rear bearing air cooling system includes a design that provides operating conditions that are beneficial to bearing health and life.

Another technical advantage of the disclosed rear bearing air cooling system includes a simplified routing for the cooling air to and from the rear bearing along the engine centerline.

Another technical advantage of the disclosed rear bearing air cooling system includes the elimination of a buffer air cooler on a cooling air supply line.

Another technical advantage of the disclosed rear bearing air cooling system includes a structure to mount a lubricant supply line to supply the lubricant to the rear bearing.

There has been provided a rear bearing air cooling system. While the rear bearing air cooling system has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A rear bearing air cooling system comprising:
an engine inlet section housing a nose cone;
a central rotor shaft interior of the nose cone;
a central static tube disposed within the central rotor shaft;
a rear bearing supporting the central rotor shaft; and a cooling air passage formed through the nose cone and the central rotor shaft, the cooling air passage in fluid communication with the nose cone, the rear bearing and a nose cone vent.

2. The rear bearing air cooling system according to claim 1, wherein the central static tube bounds the cooling air passage configured to facilitate cooling air transport through the central rotor shaft from the rear bearing to the nose cone vent.

3. The rear bearing air cooling system according to claim 1, wherein a cooling air is in fluid communication with the cooling air passage, the cooling air configured to cool the rear bearing.

4. The rear bearing air cooling system according to claim 3, wherein a liquid lubricant is fluidly coupled with the cooling air, entrained in the cooling air and provided to lubricate the rear bearing.

5. The rear bearing air cooling system according to claim 4, wherein the liquid lubricant is a fuel.

6. The rear bearing air cooling system according to claim 5, further comprising:
perforations formed in the nose cone in fluid communication with an annular tube, wherein the cooling air is impelled into the cooling air passage through the perforations in the nose cone via a ram air pressure near a nose cone exterior.

7. The rear bearing air cooling system according to claim 6, wherein the cooling air passage is configured to discharge the cooling air through the nose cone vent at an engine static air pressure.

8. An attritable gas turbine engine rear bearing air cooling system comprising:
an engine inlet casing connected to a nose cone;
a central rotor shaft connected to engine inlet casing interior of the nose cone; wherein the central rotor shaft is configured to translate rotary motion along a length of a gas turbine engine;
a central static tube disposed within the central rotor shaft;
a rear bearing supporting the central shaft; and
a cooling air passage formed through the nose cone and along the central rotor shaft, the cooling air passage in fluid communication with the nose cone, the rear bearing and a nose cone vent.

9. The attritable gas turbine engine rear bearing air cooling system according to claim 8, wherein the central static tube bounds the cooling air passage fluidly coupling the cooling air through the central static tube from the rear bearing to the nose cone vent.

10. The attritable gas turbine engine rear bearing air cooling system according to claim 8, further comprising:
perforations formed in the nose cone in fluid communication with the cooling air passage, wherein the cooling air is impelled into the cooling air passage through the perforations in the nose cone via a ram air pressure near a nose cone exterior.

11. The attritable gas turbine engine rear bearing air cooling system according to claim 10, wherein the cooling air passage is configured to discharge the cooling air through the nose cone vent at an engine static air pressure, the engine static pressure being less than the ram air pressure near the nose cone exterior.

12. A process for cooling an attritable gas turbine engine rear bearing with a rear bearing air cooling system comprising:
connecting an engine inlet casing to a nose cone;
connecting a central rotor shaft to the engine inlet casing;
disposing an insulated central static tube within the central rotor shaft;
supporting the central rotor shaft with a rear bearing;
forming a cooling air passage through the nose cone and along the central rotor shaft; and
fluidly coupling the cooling air passage with the nose cone, the rear bearing and a nose cone vent.

13. The process of claim 12, further comprising:
forming the central static tube as a portion of the cooling air passage; and
fluidly coupling the cooling air through the central static tube from the rear bearing to the nose cone vent.

14. The process of claim 13, further comprising:
forming perforations in the nose cone in fluid communication with cooling air passage; and
impelling the cooling air into the cooling air passage through the perforations in the nose cone via a ram air pressure near a nose cone exterior.

15. The process of claim 14, further comprising:
configuring the cooling air passage to discharge the cooling air proximate the nose cone vent at an engine static air pressure, the engine static pressure being less than the ram air pressure near the nose cone exterior.

16. The process of claim 15, further comprising:
fluidly coupling a liquid lubricant with the cooling air;
entraining the liquid lubricant in the cooling air; and
lubricating the rear bearing.

17. The process of claim 16, wherein the liquid lubricant is a fuel.

18. The process of claim 12, further comprising: passing the cooling air over the rear bearing; and cooling the rear bearing.

* * * * *